(12) United States Patent
Crocker

(10) Patent No.: US 11,725,352 B2
(45) Date of Patent: Aug. 15, 2023

(54) HYDRO DEMOLITION UNIT

(71) Applicant: Waterblasting, LLC, Stuart, FL (US)

(72) Inventor: James P. Crocker, Stuart, FL (US)

(73) Assignee: Waterblasting LLC, Stuart, FL (US)

( * ) Notice: Subject to any disclaimer, the term of this patent is extended or adjusted under 35 U.S.C. 154(b) by 0 days.

(21) Appl. No.: 17/565,310

(22) Filed: Dec. 29, 2021

(65) Prior Publication Data

US 2022/0205192 A1 Jun. 30, 2022

Related U.S. Application Data

(60) Provisional application No. 63/131,632, filed on Dec. 29, 2020.

(51) Int. Cl.
*E01C 23/12* (2006.01)
*E04G 23/08* (2006.01)

(52) U.S. Cl.
CPC .......... *E01C 23/128* (2013.01); *E04G 23/081* (2013.01)

(58) Field of Classification Search
CPC ............... E01C 23/128; E01C 23/0933; E01C 23/0946; E01C 23/096; E01C 23/0993; E01C 23/088; E01C 23/127; E04G 23/081
See application file for complete search history.

(56) References Cited

U.S. PATENT DOCUMENTS

2001/0011841 A1 8/2001 MacNeil et al.
2007/0096539 A1* 5/2007 Walker ................ E01C 23/0933
299/39.3
2011/0204699 A1* 8/2011 Hilmersson .............. B28D 1/22
239/71

(Continued)

FOREIGN PATENT DOCUMENTS

CA 1233638 3/1988
CN 105603887 A * 5/2016

(Continued)

OTHER PUBLICATIONS

Machine translation of Park et al., KR-20120088211-A published Aug. 8, 2012 (7 pages) (Year: 2012).*

(Continued)

*Primary Examiner* — Abby J Flynn
*Assistant Examiner* — Michael A Goodwin
(74) *Attorney, Agent, or Firm* — McHale & Slavin, P.A.

(57) ABSTRACT

A mobile vehicle mounted hydro demolition system comprising ultra-high pressurized water through a rotating nozzle water jet for cutting concrete, including a water supply, a vacuum blower, and a vacuum container that has offset with a dewatering bag so that incoming water can be pumped off as wastewater. A remote control gives an operator immediate adjustments of the rotational speed of the nozzle; the transverse traversing speed of the nozzle; the forward advancement of the vehicle; the number of traverses the head traverses before the vehicle advances its predetermined step; the pressure of the high-pressure pump; the amount of vacuum cfm's the blowers are producing; the steering of the vehicle; and the traversing distance of the rotating nozzle. By manipulating the above parameters the depth of removal is predictable and provides a consistent depth.

13 Claims, 6 Drawing Sheets

(56) References Cited

U.S. PATENT DOCUMENTS

| | | | | |
|---|---|---|---|---|
| 2014/0270956 A1* | 9/2014 | Seovic | ................. | E01C 23/088 |
| | | | | 404/93 |
| 2016/0250669 A1* | 9/2016 | Crocker | ............. | F04D 29/2222 |
| | | | | 134/104.2 |
| 2018/0193777 A1 | 7/2018 | Crocker | | |
| 2018/0371711 A1* | 12/2018 | Crocker | ............. | E01C 23/0993 |
| 2020/0232170 A1* | 7/2020 | Crocker | ................ | E01C 23/088 |
| | | | | 404/93 |

FOREIGN PATENT DOCUMENTS

| | | | |
|---|---|---|---|
| KR | 20120088211 A | * | 8/2012 |
| WO | WO2018175672 | | 9/2018 |
| WO | WO2020150601 | | 7/2020 |

OTHER PUBLICATIONS

Machine translation of Dong et al., CN-105603887-A published May 25, 2016 (11 pages) (Year: 2016).*

* cited by examiner

HYDRO DEMOLITION UNIT

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 63/131,632, entitled "MOBILE CONCRETE REMOVER," filed Dec. 29, 2020; the contents of which are incorporated herein by reference.

FIELD OF THE INVENTION

This invention is directed to the field of concrete repair, and in particular, to a mobile vehicle for removing hardened structural concrete for roadway and other concrete structural repairs.

BACKGROUND OF INVENTION

Concrete removal is commonly performed for structural repair of roads, bridges, and other concrete structures. Concrete overlying the damaged area is removed before repair and replacement can take place. Typically, the damaged part is caused by the underlying reinforcing bar material (rebar). Rebar is defined as the steel bar or mesh of steel wires used to strengthen concrete under tension. Concrete is strong under compression, but has weak tensile strength. Rebar significantly increases the tensile strength of the concrete.

Basic concrete removal is commonly performed by use of a pneumatic jack hammer or the like device. Operation of a jack hammer requires an operator to estimate the depth of material removal, and attempt to avoid cutting into or otherwise damaging structural reinforcement such as rebar, steel reinforcing rod in concrete problem with concrete removal is that the placement of the rebar is not always predictable and a lack hammer can easily impact and otherwise damage the rebar. Further when a jack harmer impacts rebar the associated vibration carries into the surrounding concrete. Such vibration can produce stress fractures beyond a repair area thereby enlarging the area of repair needed, which can result in endless process. Operation of a jack hammer also results in the copious production of cement dust; the scattering of concrete chips makes it most difficult to judge depth and quality of the concrete removal. Conventional concrete repair requires the cement dust and chips to be removed to prevent the replacement material from being contaminated.

Bridge spans are an example whereas aged, defective or damaged regions of concrete must be removed and rebar exposed before the span can be repaired or reinforced with new concrete. During the excavation of the damaged concrete, it is important to avoid damaging the rebar and the adjoining concrete. The impacts from a jack hammer can weaken the concrete areas adjacent to the area(s) being repaired. Tiflis is especially problematic where the structure aged and the concrete is brittle from thermal stress. In such instances, the jack hammer can enlarge existing cracks and cause new cracks.

Another known method of concrete removal includes the use of water directed to the concrete at high pressure. However, without proper removal of debris, water and debris will settle back onto the removal areas wherein the debris reconstitutes into a semi hard material that is again difficult to remove. Typically a secondary process must be used to remove the reconstituted material.

What is lacking in the industry is a self propelled mobile vehicle capable of concrete removal by ultra high pressure, alternatively ultra high pressure can cutting teeth. The vehicle may be advanced by an encoder to control forward movement, a remote controlled steering system for direction movement, and actuators for real time adjustment of the cutting head during material removal.

SUMMARY OF INVENTION

A mobile vehicle system for delivery of ultra-high (20,000-60,000 psi) pressurized water through a rotating nozzle water jet for removal of concrete. Adjacent polycrystalline diamond cutting teeth may also be employed for efficiency in concrete demolition. The water et and cutting teeth are secured to the vehicle by a control arm constructed and arrange to move horizontally along a rail by a traverse motor and vertical dv the operation of a control arm cylinder. The mobile vehicle employs an engine driven high pressure pump drawing from a vehicle mounted water supply tank for stand-alone operation or for use in conjunction with a water tanker supply vehicle. The vehicle includes a vacuum system including a vacuum tank with a dewatering bag. In the preferred embodiment a hydrostatic transmission with an encoder is used in combination with a PLC to control advancement of the vehicle, and an automated steering system to control direction movement of the vehicle.

A wireless remote control allows an operator control of the vehicle and institute immediate adjustments of certain parameters of the cutting head assembly including the rotational speed of the cutting head; the traversing speed of the cutting head; forward advancement of the vehicle in inches; number of traverses the head traverses before the vehicle advances; pressure of the high-pressure pump; the amount of vacuum cfm's the blowers are producing; the steering of the vehicle; and the traversing distance of the rotating nozzle. By manipulating the above parameters the depth of removal can be set to a consistent depth. If rotten concrete is encountered the depth or limits of removal will automatically extend to eradicate said areas. The nozzle jet has an adjustable traversal along the rear of the mobile vehicle. The mobile vehicle is advanced incrementally across a predetermined work area. The RPMs and speed of traversal of the rotating cutting head are adjustable by remote control. The cutting head is positioned within a telescoping shroud on the bottom of the cutting head assembly. The efficiency of the vacuum system works in combination with the telescoping shroud which is highly effective in removal of water and debris.

The device allows concrete removal to a prescribed depth with or without rebar. Where rebar is employed, cutting may extend beyond the rebar without doing damage to the rebar by use of only the rotating nozzle water jet which also improves the condition of rebar by scouring, allowing for subsequent bonding of the conditioned rebar with fresh concrete. Where rebar is not part of the operation, the use of cutting teeth in combination with the water jet allows for efficiency in concrete removal.

The cutting head assembly is advanced by the forward movement of the mobile vehicle using an encoder which measures the distance of mobile vehicle travel in increments of $1/1000$'s of an inch so a step forward distance can be closely matched to the width of the cutting nozzle. The number of traverses can be controlled before a step forward distance in order to control the depth of removal. The depth of concrete removal can be anywhere from $1/4$ of an inch to more than 10 inches or more of concrete.

Concrete debris is drawn away from the work area with a vacuum pump using a blower 31 drawing 2,000 to 8,000 CFM on the vacuum side with up to 27 inches of mercury. A 4-8 yard debris body collects the large concrete debris; the dewatering tank 62 is mounted on a scissor lift 64 that can be raised 12 feet in the air for ease of dumping into an adjacent dump truck or other waste bin. A 50 micron fabric mesh hangs inside of the dewatering tank to capture rocks and stones, but allow the water to exit. A hydraulic, air powered, or electric powered, dewatering pump is used to evacuate the dewatering tank as the water enters.

An objective of this invention is to provide a singular mobile vehicle capable of removing concrete to a required depth both rapidly and efficiently using a traversing head with a rotating ultra high pressure water nozzle jet for removal of concrete, without damaging underlying rebar if present, or causing damaging vibrations to adjoining concrete regions commonly associated with impact removal tools.

Another objective of this invention is to provide a singular mobile vehicle capable of removing concrete to a required depth both rapidly and efficiently using a traversing head with a rotating ultra high pressure water nozzle jet with adjacent cutting teeth.

Another objective of the invention is to provide a system to provide a concrete removal system that is adjustable from 0.25 inch removal to more than 10 inches of concrete removal.

Still another objective of the invention is to provide a concrete demolition system that captures debris and concrete dust by use of a vacuum removal system and a debris collection tank.

Yet another objective of the invention is to provide a mobile device that reduces dust pollution during the concrete removal process by use of a dust filtration system so as to enhance visibility around the work area.

Still another objective of the invention is to provide a mobile device to safely remove concrete from around rebar and scour the surfaces of the concrete to allow a better bond with new concrete.

Yet still another objective of the invention is to provide a vacuum system that is capable of retrieving concrete chips and dust for disposal into a container that can extend 12 feet in the air for dumping the collected debris into a visiting dump truck.

Another objective of the invention is to provide a concrete demolition system wherein the vehicle can be advanced in movement by use of encoder for measuring distance of travel allowing a step forward distance when the of concrete is reached and the equipment made movable.

Yet still another objective of the invention is provide a hydro demolition system with actuators capable of adjusting the cutting head distance from concrete material in real time.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
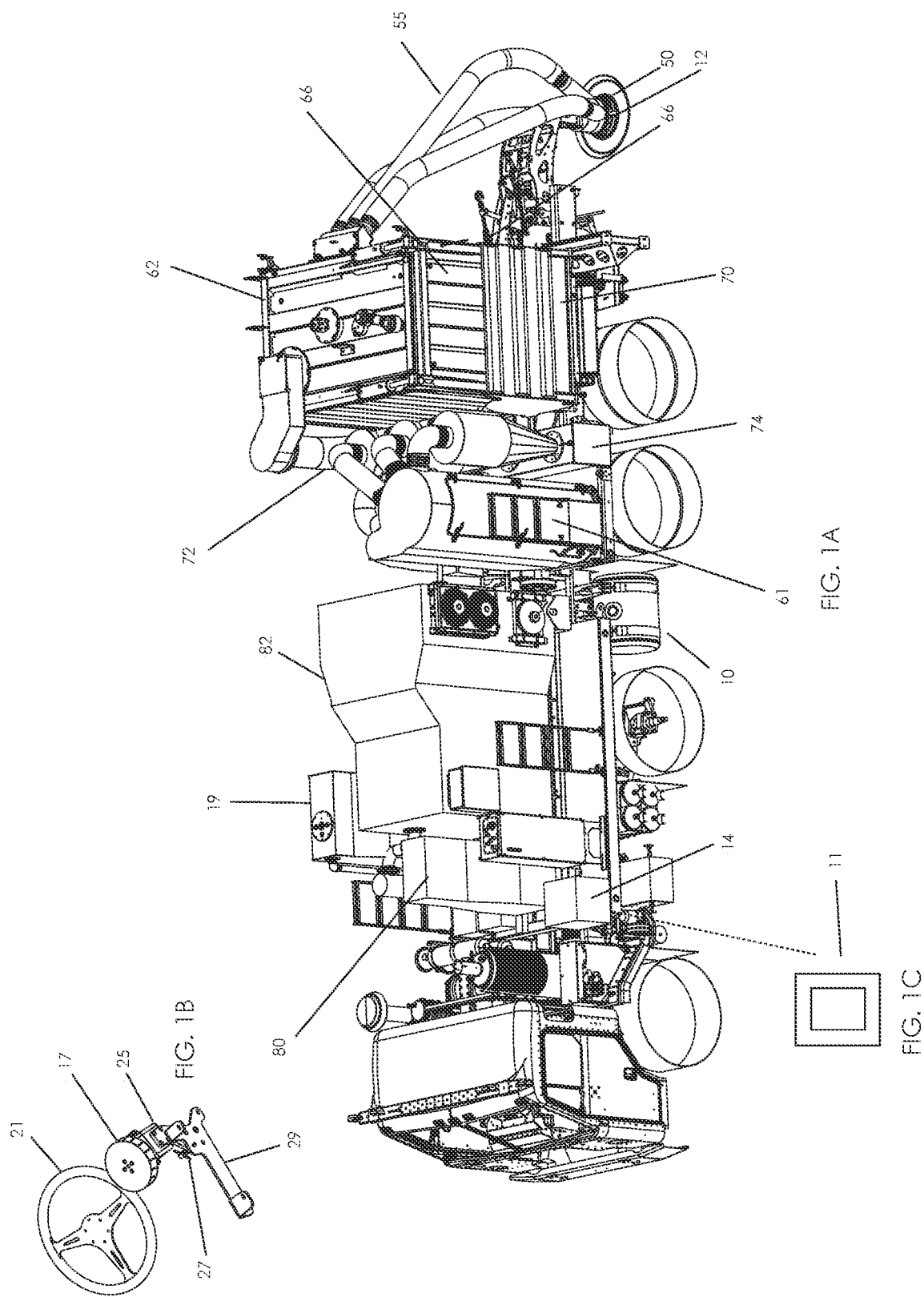
FIG. 1A is a front perspective view of the cement cutting system on a mobile vehicle.
FIG. 1B is a perspective view of the steering wheel driver.
FIG. 1C is a perspective view of a wireless remote controller.
Figure 2:
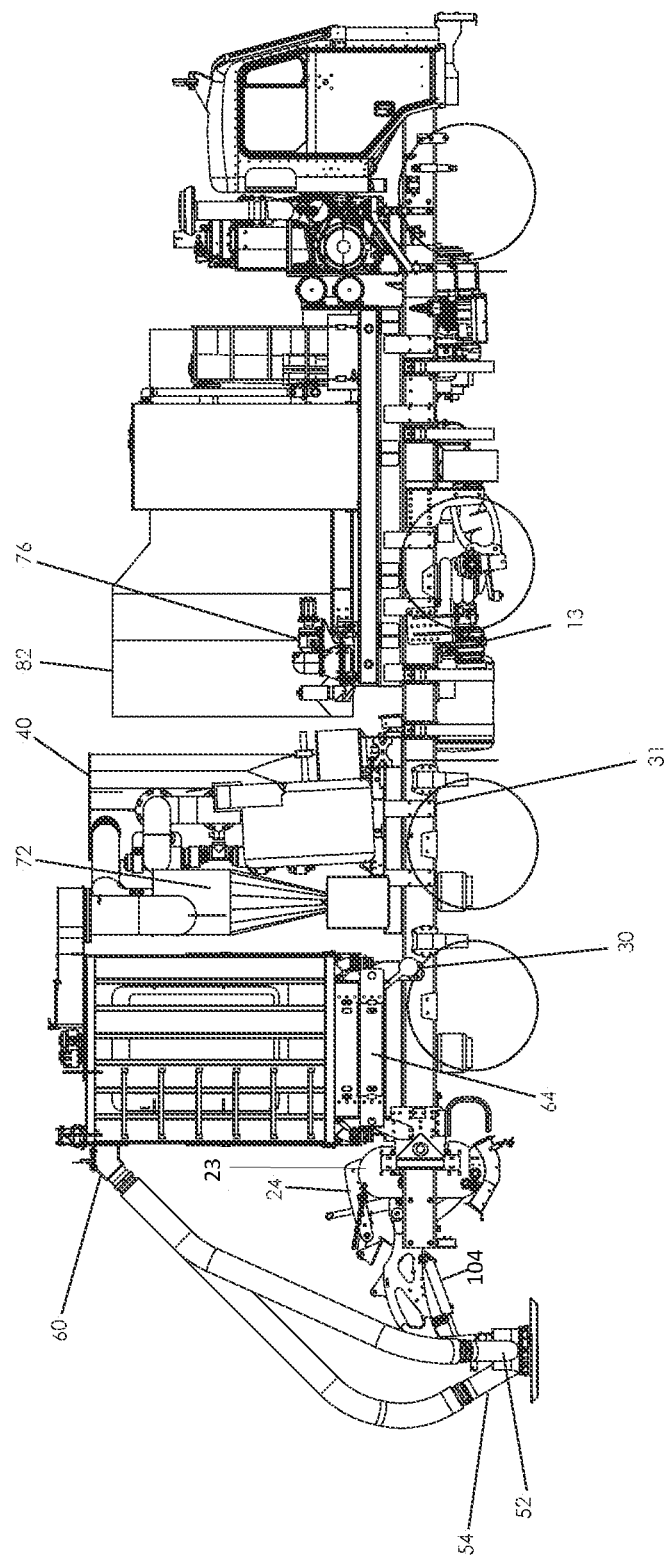
FIG. 2 is a right side plane view.
Figure 3:
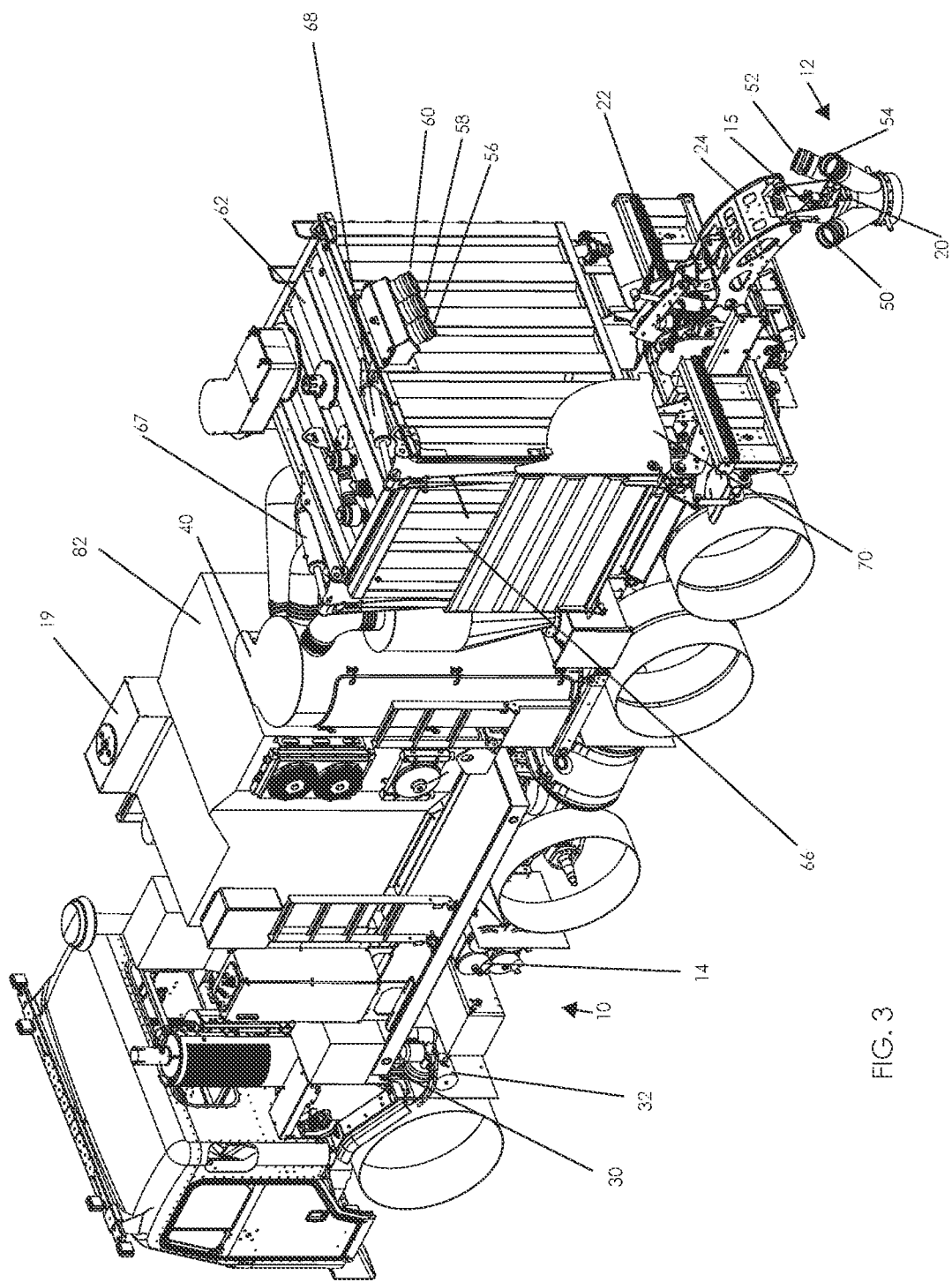
FIG. 3 is a rear perspective view.
Figure 4:
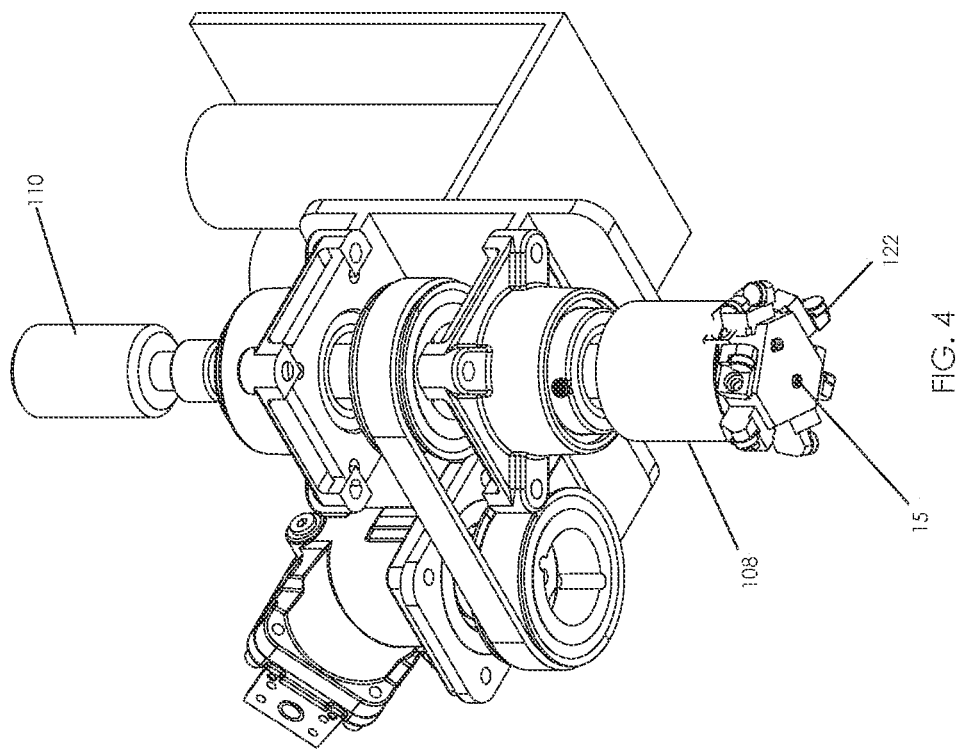
FIG. 4 is a lower perspective view of the drive motor and cutting head.
Figure 6:
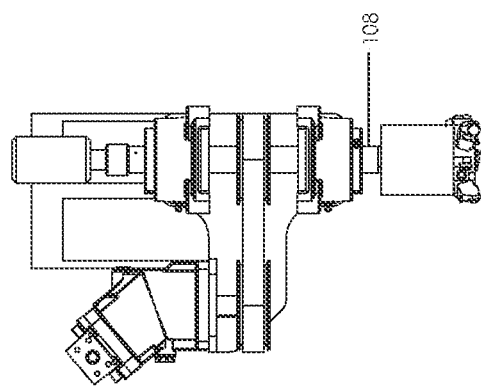
FIG. 6 is an upper perspective view thereof.
Figure 5:
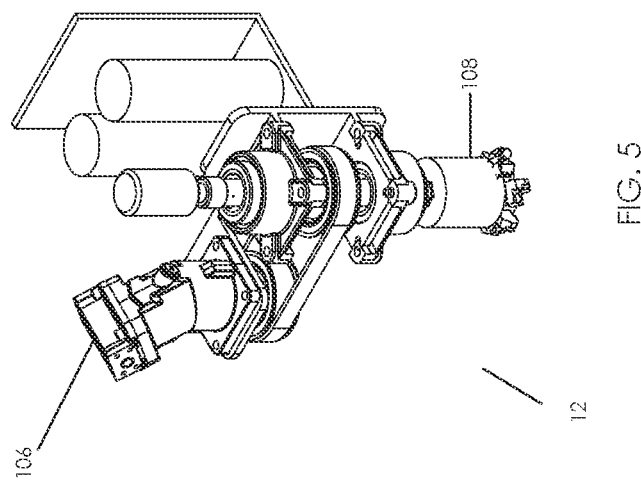
FIG. 5 is a side view thereof.
Figure 8:
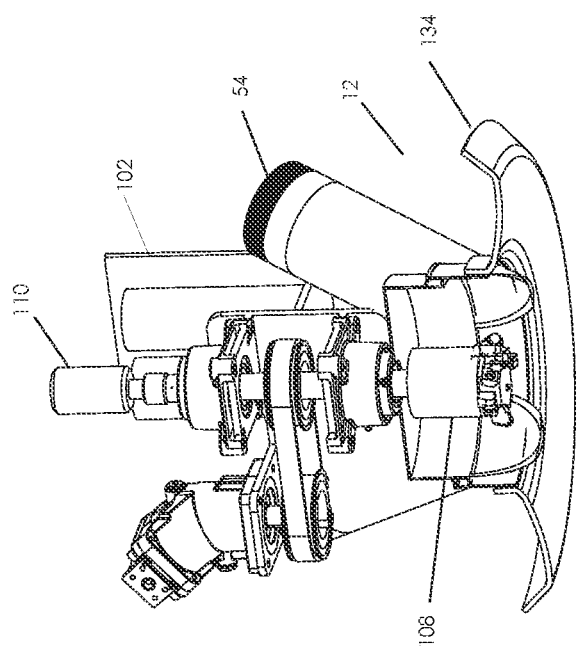
FIG. 8 is a cross sectional of the telescopic shroud.
Figure 7:
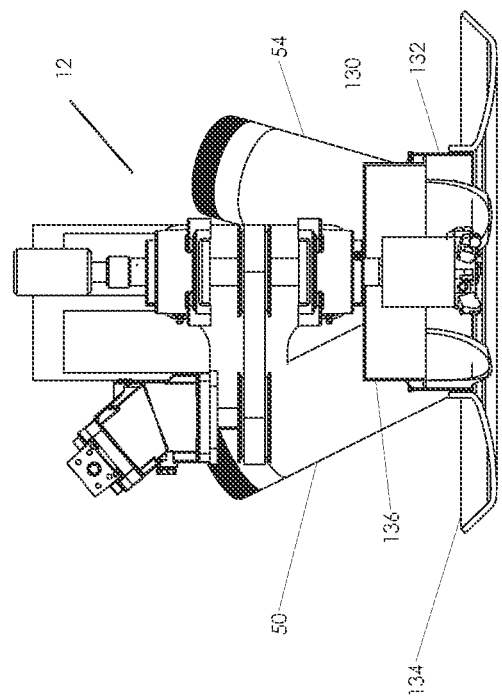
FIG. 7 is a side view of the cutting head with the telescopic shroud.
Figure 10:
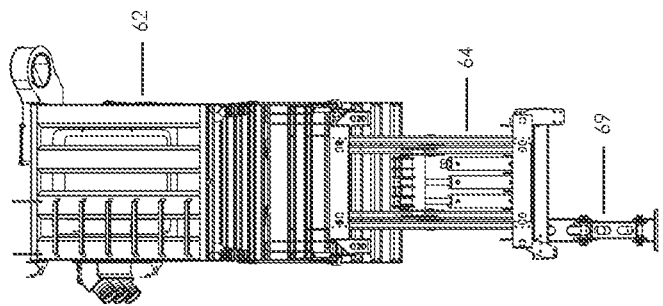
FIG. 10 is a right side view of the dewatering tank in an elevated position for dumping of debris.
Figure 9:
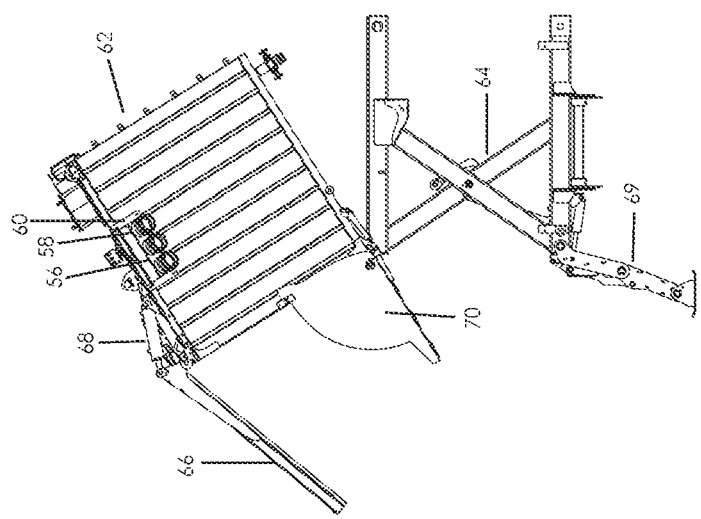
FIG. 9 is a rear view of the dewatering tank in an elevated position for dumping of debris.
Figure 11:
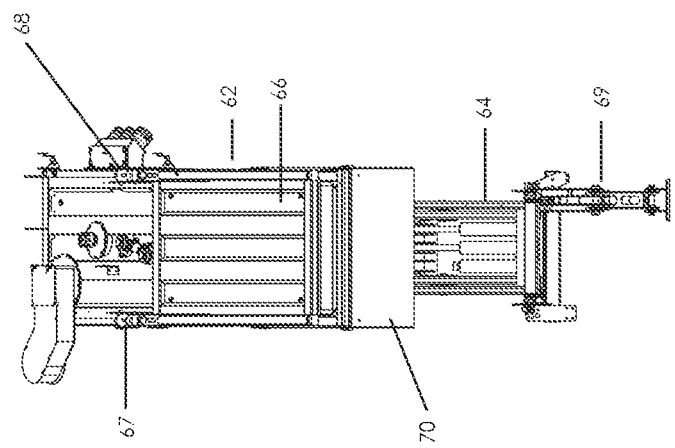
FIG. 11 is a left side view of the dewatering tank in an elevated position for dumping of debris.

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to the Figures, a mobile self propelled vehicle 10 is the platform for a concrete cutting system that delivers ultra-high pressure water to a rotating nozzle water jet 15 included in a cutter head assembly 12. The nozzle water jet 15 is constructed and arranged to cut concrete at a predetermined flow rate, pressure amount, and displacement period, which is calculated by a programmable logic controller 14. A remote controller 11 is wirelessly coupled to the controller wherein adjustments can be made by operator positioned outside the cab 16. The controller 14 works in combination with a hydrostatic drive 13 with input from an encoder 30 to calculate step forward movement of the vehicle remote controlled steering motor 25 is mounted on folding bracket. 27 secured within the cab with a mounting bracket 29. The steering motor 25 is for rotating a drive wheel 17 which engages the steering 21 for directional control of the vehicle while under remote control. When not in use, the drive wheel 17 is folded into a storage position.

The amount of water pressure needed for a given water flow rate to cut concrete to a predetermined depth is made by the controller 14 in combination with actuators 104 used for incremental adjustment of the position of the cutter head assembly. A vehicle mounted water tank 19 allows mobility during concrete demolition. In addition, the mobile vehicle may receive water from an adjoining water tanker or in stationary operations, from a fire hydrant.

Concrete demolition is performed by moving the rotating nozzle water jet 15 within the cutter head assembly 12. The cutter head assembly 12 is secured to the support rail 22 by a control arm 24. The control arm 24 traverses the support rail 22 by operation of the traverse motor 23 allowing the cutter head assembly 12 to move laterally along the rear of the vehicle. The control arm 24 allows for the vertical displacement of the cutter head assembly 12 with actuators 104 providing instant control of cutting depth in real time. The actuators are cylinders strategically positioned to allow precise placement of the cutting head, controllable by the controller. The cutter head assembly 12 is movable in a horizontal direction by tracking of the support rail 22 and/or vertical movement by raising or lowering the cutter head assembly 12 by the actuators 104. It should be noted that the support rail 22 depicted is only illustrative of a rail that is the width of the vehicle 10. The rail can be made longer to provide a greater lateral distance.

The rotating nozzle water let 15 within the cutter head assembly 12 causes the accurate demolition of concrete to a desired de; the rotating nozzle having RPM's and traversing speed made adjustable by the controller with finite operations that can be input through the remote controller. The base of the cutter head assembly 12 includes a shroud 132 to contain concrete chips and dust within the cutter head assembly 12. The shroud geometry includes multiple vacuum lines and is constructed and arranged for efficiency in removing most all of the resulting water and debris thereby greatly increasing the productivity of the concrete cutting whereas machines would have to cut through the accumulated water and debris as it accumulated. Visibility is greatly enhanced by the immediate suppression and removal of concrete debris and associated dust that would otherwise cloud the work area when jack hammers are used, or contaminate the area as the cut debris contaminates the area.

The rotating nozzle water jet 15 allows concrete removal to a prescribed depth without damaging underlying rebar. The rotating nozzle water jet 15 further allows concrete removal to extend beyond the rebar, which allows fresh concrete to be placed around the existing rebar. The rotating nozzle water jet improves the condition of rebar by scouring, allowing for subsequent bonding of the conditioned rebar with fresh concrete.

The remote control 11 gives an operator control of immediate adjustments to the rotational speed of the nozzle; the transverse traversing speed of the nozzle; the forward advancement of the vehicle; the number of traverses the head traverses before the vehicle advances its predetermined step; the pressure of the high-pressure pump; the amount of vacuum cfm's the blowers are producing; the steering of the vehicle; and the traversing distance of the rotating nozzle. By manipulating the above parameters thus the depth of removal is easily set to a consistent depth.

Movement of the vehicle is monitored by an encoder 30 which is capable of causing step forward movement of the vehicle through communication with the controller 14 for operating of the hydrostatic drive 13. The encoder 30 secured to the vehicle 10 measures the distance of travel in increments of 1/1000 of an inch so a step forward distance can be closely matched to the width of the nozzle water let 15. The number of times the nozzle water jet 15 traverses can be controlled before a step forward distance to control the depth of concrete removal. The depth of concrete removal can be anywhere from 1/4 of an inch to more than 10 inches of concrete. The controller may also instruct the vehicle in forward or reverse functions, wherein the mobile vehicle forward and backward movement is automated.

Concrete debris is drawn away from the work area with a vacuum system 40 drawing 2,000 to 8,000 CFM on the vacuum side, with up to 27 inches mercury. The debris that results from the concrete cutting is drawn through multiple outlets; preferably the system employs three outlets 50, 52, and 54 positioned on the port, starboard and rear of the cutter head assembly 12 for efficient collection of concrete debris and water used by the nozzle water jet 15. The outlets are fluidly connected by hoses 55 to suction inlets 56, 58 and 60, which lead into dewatering tank 62 capable of holding 4-8 cubic yards of debris. The dewatering tank 62 collects the concrete debris and is placed on a scissor lift 64 that can be raised 12 feet in the air for ease of dumping into an adjoining dump truck, not shown. When the dewatering tank 62 is raised, a discharge door 66 is lifted by hydraulic cylinders 67 and 68, and a debris chute 70 is rotated from a vertical position to a horizontal position for ease of discharge. Stabilizing leg 69 operates with scissor lift to provide additional stability to the vehicle when the dewatering tank 62 is expelling the collected debris. The dewatering tank 62 includes a dewatering step working in combination with the vacuum system 40, wherein a fifty micron fabric mesh filter, not shown, hangs inside of the dewatering tank 62 to capture rocks and stones, but allow the water to be discharged. The vacuum system 40 includes at least one cyclone separator 72, having a collection and discharge chamber 74, for further dust removal. A dewatering pump 76 can be hydraulic, air powered, or electric powered for use in evacuating the dewatering tank 62 as the water enters. Air filters 61 remove the remaining particulates from the debris drawn from the work area.

The high pressure pump 80 produces between 20,000-60,000 psi at a rate between 15-60 gallons per minute, powered by a suitable engine 82 sized to operate the high pressure pump 80. In the preferred embodiment the engine is between 400-800 HP.

In an embodiment of the hydro demolition unit a rotating or oscillating waterjet having a nozzle designed to cut concrete while leaving rebar intact. The unit includes of an arm to which the rotating or oscillating water let head attaches too. A shroud is positioned around the water jet to contain a work area, the shroud formed from a thick reinforced rubber to contain water and debris. A tooth-gear rack and pinion that is able to provide left to right movement of the waterjet traversing back and forth across the width, or extended width of a mobile truck. The mobile vehicle carrying a water tank 19 for holding fresh water and a dewatering tank 62 into which debris is suctioned.

A de-watering bag is placed within the dewatering tank 62 for filtering out chips and the like large particles that are suctioned up. The shroud maintaining the debris from the demolition area in a position that allows ease of suction into the dewatering tank. Suction of the debris is provided by at least one blower, preferably a positive displacement rotary load blower.

The mobile vehicle used for the aforementioned components employs a large gear box that transfers power from the truck engine and to rotate hydraulic pumps used for spinning the blowers and moving the vehicle. A hydrostatic drive section of the gearbox allows for incremental movement of the truck to produce, together with the lateral movement of the traversing head, a programmable pattern on concrete surfaces for a continuous demolition of concrete while the vehicle is advanced. A steering motor attached to the steering system allows the truck to be steered by remote control.

A programmable logic controller (PLC) or the like ruggedized computer, is able to adjust the left to right traversing movement of the waterjet head, the number of passes before stepping of the truck, the number of inches the truck steps forward upon completing cutting passes, the speed of the blowers, the rotational speed of the waterjet head, indication of high pressure and low inlet pressure, as well as many other variables.

The traversing head housing the cutter head assembly including a frame support 102 housing the actuators 104, drive motor 106 and cutting/blasting bit 108. The cutting/blasting bit 108 is secured to the frame support 102 with a through shaft 108 extending to a high pressure spindle head 110. The through shaft having a lower bearing housing 112 and upper bearing housing 114. A belt 116 provides transmission rotation forces from the drive motor 106 to the through shaft 108. In one embodiment the cutting head 108 includes two high pressure nozzles jets 15 and a plurality of PCD teeth 122.

A shroud 103 is formed from an adjustable side wall member 132 having a skirt 134 that is slidable within a fixed side wall member 136 allowing telescoping of the skirt 134 to contain debris movement. The skirt 134 is formed from fiber or metal reinforced rubber skirt for vacuum recovery.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one more features. Furthermore, a device or structure that is configured in a certain way is configured in at least that way, but may also be configured in ways that are not listed.

All parents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the sprit of the invention and are defined by the scope of the appended claims. Although the invention has been described in connection with specific preferred embodiments, it should be understood that the invention as claimed should be unduly limited to such specific embodiments. Indeed, various modifications of the described modes for carrying out the invention which are obvious to those skilled in the art are intended to be within the scope of the following claims.

What is claimed is:

1. A mobile hydro demolition vehicle comprising:
   a mobile vehicle;
   a support rail mounted extending along a width of said mobile vehicle;
   a control arm having a first end movable along width of said support rail by a traverse motor, a second end of said control arm movable vertically by at least one actuator hydraulic lift cylinder;
   a cutting head assembly secured to said second end of said control arm, said cutting head assembly housing a drive motor coupled to a rotatable cutting head, said cutting head having a distal end including at least one high pressure water nozzle jet, said drive motor adjusting rotation speed of said cutting head;
   a high pressure water pump mounted to said vehicle and fluidly coupled to said nozzle jet, said high pressure water pump coupled to a water tank;
   a contoller electrically coupled to said control arm, said controller calculates a number of traverses by said cutting head to control depth of demolition and is constructed and arranged to control movement and operation of said cutting head assembly;
   a shroud positionable over said cutting head assembly to contain debris in a work area loosened by said cutting head;
   a vacuum system coupled to said cutting head assembly for drawing the loosened debris from the work area; and
   a dewatering tank for receipt of the loosened debris drawn from the work area by said vacuum system.

2. The mobile hydro demolition vehicle according to claim 1 wherein said cutting head includes a plurality of polycrystalline diamond teeth positioned adjacent to said at least one high pressure water nozzle jet.

3. The mobile hydro demolition vehicle according to claim 1 including an encoder secured to a drive line and hydrostatic drive of said mobile vehicle, said encoder constructed and arranged to measure the distance of mobile vehicle travel in increments of $1/1000$'s of an inch wherein a step forward distance can be matched to a width of said cutting head and communicated to the controller.

4. The mobile hydro demolition vehicle according to claim 1 wherein said at least one actuator hydraulic lift cylinder is secured to said cutting head assembly for adjusting the depth of demolition of said cutting head with instructions received from said controller.

5. The mobile hydro demolition vehicle according to claim 1 wherein said shroud includes an adjustable side wall member forming a skirt that is slidable within a fixed side wall member allowing telescoping of said skirt to contain debris movement and increase efficiency of the vacuum system.

6. The mobile hydro demolition vehicle according to claim 5 wherein said skirt is constructed of rubber reinforced with fiber or metal.

7. The mobile hydro demolition vehicle according to claim 1 including air filters constructed and arranged to remove particles from the debris from a work area.

8. The mobile hydro demolition vehicle according to claim 1 wherein said high pressure water pump operates between 20,000 psi and 60,000 psi.

9. The mobile hydro demolition vehicle according to claim 1 wherein pressure of the high-pressure water pump and vacuum system is adjustable by said controller.

10. The mobile hydro demolition according to claim 1 including a remote control wire attached to said controller.

11. The mobile hydro demolition vehicle according to claim 1 wherein said controller is coupled to a steering motor on said mobile vehicle wherein said mobile vehicle can be steered remotely.

12. The mobile hydro demolition vehicle according to claim 1 wherein debris is drawn away from the work area with vacuum pump drawing 2,000 to 8,000 CFM with up to 27 inches of mercury.

13. The mobile hydro demolition vehicle according claim 1 wherein said dewatering tank holds between 4-8 cubic yards of debris, said dewatering tank is placed on a scissor lift that can be raised for ease of dumping.

\* \* \* \* \*